P. I. VIEL.
VEHICLE WHEEL.
APPLICATION FILED NOV. 7, 1910.
1,034,847.
Patented Aug. 6, 1912.
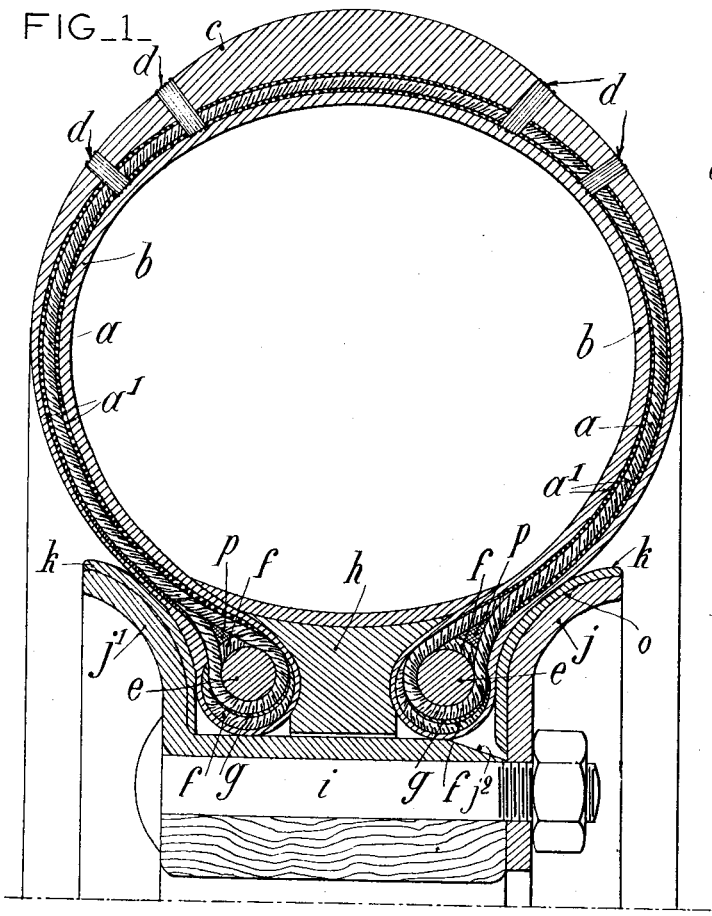
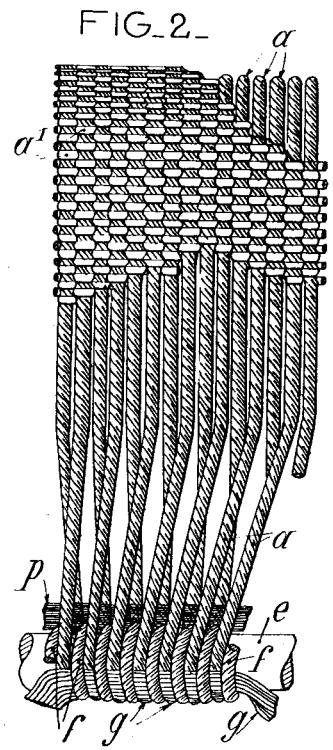
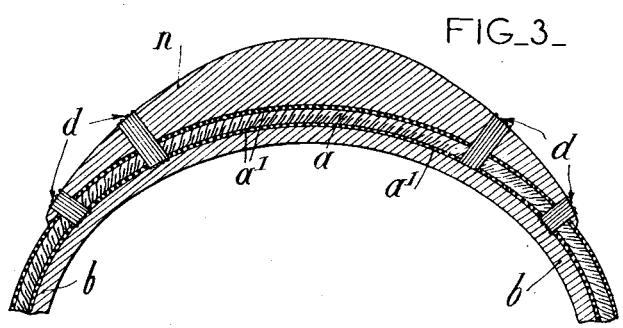
Witnesses:
Edw. S. Dubois
Chas. L. Debonneville
Inventor
Paul Isidore Viel
by
his Attorney

UNITED STATES PATENT OFFICE.

PAUL ISIDORE VIEL, OF PARIS, FRANCE.

VEHICLE-WHEEL.

1,034,847.  Specification of Letters Patent.  Patented Aug. 6, 1912.

Application filed November 7, 1910. Serial No. 590,992.

*To all whom it may concern:*

Be it known that I, PAUL ISIDORE VIEL, citizen of France, residing at 3 Place Daumesnil, Paris, in the Republic of France, have invented new and useful Improvements in Vehicle-Wheels, of which the following is a specification.

The casings made of metallic cables for pneumatic tires are objectionable in that the intervals left free between the adjacent coils of the cables permit of the air tube penetrating between said coils whereby it may be pinched and cut. Moreover nails and other pointed bodies may enter the intervals so that the air tube is liable to be punctured.

My invention relates to a pneumatic tire in which the above disadvantages are obviated in a simple and effective manner.

In the annexed drawings: Figure 1 is a cross-section of my tire, Fig. 2 is a partial side elevation, some parts being broken away, Fig. 3 is a cross section of one modification.

As shown in Figs. 1 and 2, the wall of the tire is formed of a number of concentric casings made of different materials but assembled together so as to form a single homogeneous body. The central casing or lining is the most resistant as it is intended to support the inner pressure and also the blows from the road. Said lining consists of an annular endless band formed by the combination or assembling of one or several metallic cables $a$ and flexible or supple non-metallic bindings $a^1$. The cables $a$ are transversely placed one next to the other and are bound together by means of said flexible bindings $a^1$ which form sewed stitches or are combined with the metallic cables in any other suitable way such as weaving, plaiting, etc. The essential point is that the rows of flexible bindings $a^1$ are juxtaposed very close one to the other so as to be in mutual contact. Said bindings may be placed at right angles to the cables $a$ or diagonally. By this means a surface is obtained which is plain on both sides and wherein no spaces are left free into which the air tube may penetrate and be cut. At the same time, the metallic cables are prevented from being displaced and from varying their relative distances. The above assembling of metallic cables and flexible bindings extends down to the beads of the tire. The flexible bindings $a^1$ may be formed of cotton, ramie, hemp, gut, or other strings, leather straps, etc., or any other suitable flexible and supple material. The metallic part $a$ of the lining may be formed by a single metal cable $a$ engaging alternately with metal rings $e$ which act as the beads of the tire; the slack of the cable encircling the air tube, not shown. The central lining being thus formed, a casing $b$ is mounted therein, which is formed of canvas bands and gum sheets as usual. The casing $b$ is fixed to the central lining $a$, $a^1$, by means of vulcanized gum or by any other suitable means.

On the outer surface of the lining $a$, $a^1$, is placed an outer casing $c$ of gum and canvas, which is secured to the lining in the same manner as the inner casing $b$, but in addition, the lining and the casing are bound together by means of stitches $d$ formed with flexible bindings, in a sufficient number for assuring a safe connection between the above members. The flexible bindings may be of the same character as those used in the formation of the lining.

The two rigid metallic rings $e$ forming the beads of the tire may have any suitable cross section. The coils formed by the winding of the cable $a$ are spaced on the rings $e$ at an equal distance one from the other by means of a cable or strap $f$ wound around each of the rings $e$ between the adjacent coils of the cables $a$. A flexible band $g$ is placed along the rings $e$ upon the coils of the cables $a$, and the cables or straps are wound over the same, so as to secure the cables $a$ in an invariable position. The cables or straps $f$ may be made of cotton, ramie, hemp, leather, steel or any suitable material.

To prevent the tire from creeping along the periphery of the wheel rim, a circular safety band $h$ is placed between the beads, said band being of leather, gum or any other resilient material. The band $h$ which is of suitable diameter and thickness is clamped at the same time as the tire beads by means of bolts $i$ and side rings $j$ $j^1$ whereby any displacement of the tire on the wheel is prevented. By means of the band $h$, the safety bolts usually employed may be dispensed with and the air tube may expand to a true circular cross section without having contact with any of the metallic parts of the wheel, so that any pinching of the same is efficiently prevented.

The metallic rim of the wheel is formed of the removable ring $j$ and the stationary ring $j^1$ having an angular section. The inner edge of the ring $j^1$ is beveled at $j^2$ for the purpose of facilitating the placing of the tire beads into position. The outer parts of the removable and fixed rings are curved at $o$ without any angular or flat portion whereby the maximum of safety is obtained so far as rupture of the cable is concerned. As the tire bead is necessarily stationary and the outer part of the tire must be capable of deformation, it is in fact an advantage to support the cable on a rounded part of maximum radius extending from the stationary part of the wheel felly, with a view of avoiding any rupture resulting from a sudden deformation.

Between the metal rings $j$ $j^1$ and the tire beads, is interposed a flexible band $k$ acting as a cushion whereby the metallic cables $a$ when distorted may bear against a resilient material. The band $k$ of gum, leather or other material may be secured either to the rings $j$ $j^1$ or to the tire beads.

In the angle formed between the parts of the cable which turn over the rings $e$, I place intermediary bands $p$ of leather, gum and canvas, or other resilient and elastic material, in view of avoiding the friction of the cable parts one against the other at the place where both parts come together after turning around the rings. The risks of rupture are thus entirely avoided.

Instead of the outer casing $d$ extending to the tire beads, I may use a narrow tread strip $n$ (Fig. 3) the lining $a$ $a^1$ being constructed in the same manner as above. This tread strip $n$ is secured to the periphery of the lining $a$, $a^1$, only, so that the metallic cables $a$ are left exposed to the atmosphere on both sides of the tire. It results therefrom that the metallic cables which are good conductors of heat act as a radiator and dissipate the heat produced by the deformation of the tire and its friction on the ground.

My improved tire is very resilient and durable owing to the lining of metallic cables and flexible bindings and the cooling of the tire is particularly rapid if the cables are left free on both sides as suggested above. The rings $e$ over which the coils of the cables are wound are of a relatively small diameter as they do not need to be stretched over the tire flanges and any slipping of the tire from the wheel rim is thereby efficiently prevented.

Having now described my invention, what I claim as new and desire to secure by Letters Patent is:

In a vehicle wheel, the combination of a rim, a pair of rings ($e$) adapted to encircle the rim, means for securing said rings to the rim, a metallic cable ($a$) engaging the rings alternately, flexible bindings ($a^1$) extending circumferentially of the rim close to each other and woven with the coils of the metallic cable so as to form with them an endless circular band having no intervals, a covering on both sides of said circular band, an air tube inside the inner covering, a cable ($f$) wound around each of the rings ($e$) between the adjacent coils of the cable ($a$), a flexible band ($g$) along the rings ($e$) and resilient bands ($p$) in the angle formed between the converging parts of the cable coils, substantially as described and for the purpose set forth.

In testimony whereof I have signed my name to this specification in the presence of two subscribing witnesses.

PAUL ISIDORE VIEL.

Witnesses:
 ANTOINE LAVOIX,
 H. C. COXE.